J. VAN GEEM.
MEASURING FAUCET.
APPLICATION FILED AUG. 21, 1913.
1,189,510.
Patented July 4, 1916.
2 SHEETS—SHEET 1.
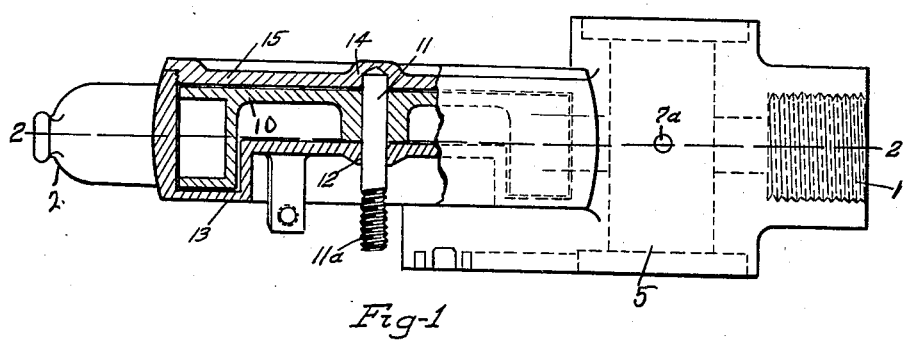
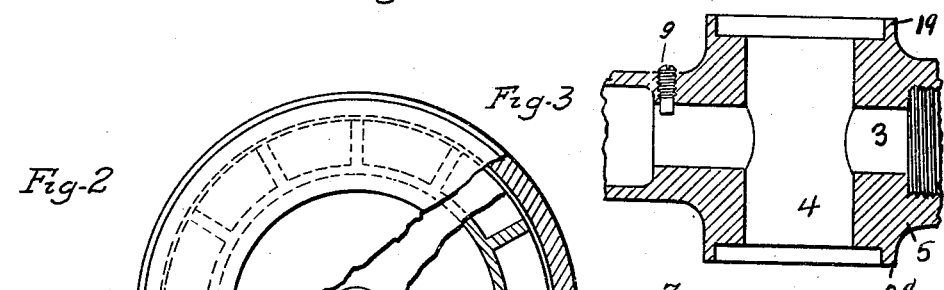
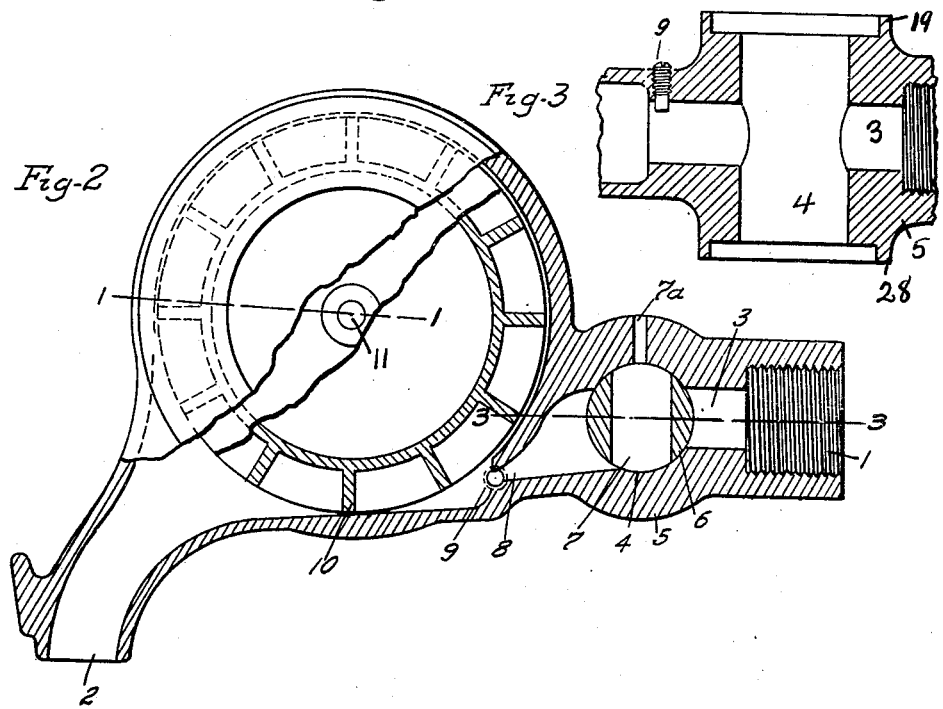
WITNESSES:
Helen E. Barnes
Vinnie Hess
INVENTOR.
John Van Geem
BY
ATTORNEY.

J. VAN GEEM.
MEASURING FAUCET.
APPLICATION FILED AUG. 21, 1913.
1,189,510.
Patented July 4, 1916.
2 SHEETS—SHEET 2.
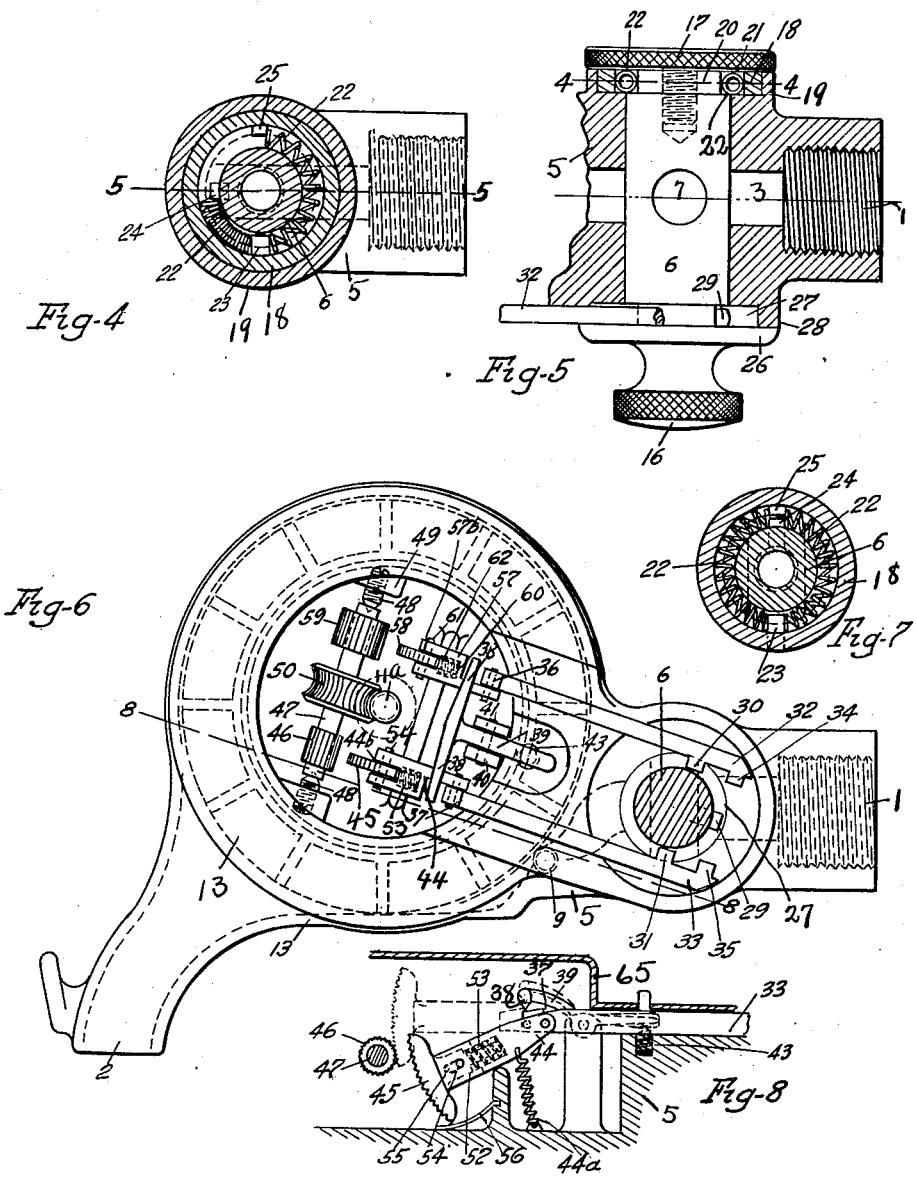

UNITED STATES PATENT OFFICE.

JOHN VAN GEEM, OF ERIE, PENNSYLVANIA.

MEASURING-FAUCET.

1,189,510.  Specification of Letters Patent.  Patented July 4, 1916.

Application filed August 21, 1913. Serial No. 785,904.

*To all whom it may concern:*

Be it known that I, JOHN VAN GEEM, a citizen of the United States, residing at Erie, in the county of Erie and State of Pennsylvania, have invented new and useful Improvements in Measuring-Faucets, of which the following is a specification.

This invention relates to measuring faucets and consists in certain improvements in the construction thereof as will be hereinafter fully described and pointed out in the claims.

While the faucet can be used for measuring different liquids it is especially designed for a beer measuring faucet. One of the difficulties in devices of this kind is to so arrange the measuring device that it can be readily shifted so as to deliver pints or quarts. In the ordinary use of such devices these two quantities are all that is desired and unless the device can be quickly shifted from one to the other it is not commercially practical.

Other objects of the invention will appear from the specification and claims.

The invention is illustrated in the accompanying drawings as follows:—

Figure 1 is a section on the line 1—1 in Fig. 2. Fig. 2 is a side elevation, partly in section on the line 2—2 in Fig. 1. Fig. 3 is a section of the valve body on the line 3—3 in Fig. 2. Fig. 4 is a section on the line 4—4 in Fig. 5 with the valve in open position. Fig. 5 is a section on the line 5—5 in Fig. 4. Fig. 6 is a side elevation of the device, a part of the valve stem being in section and the case for inclosing the parts being removed. Fig. 7 is a section on the line 4—4 in Fig. 5, with the valve in closed position. Fig. 8 is a section on the line 8—8 in Fig. 6.

1 marks the inlet end of the faucet and 2 the discharge. The inlet communicates with the way 3 and the way 3 enters a cylindrical valve opening 4 in the body 5. The valve plug 6 is of the ordinary type having the way 7 through it. The way 7 communicates with a vent 7ᵃ which permits the way 7 to discharge. The way 3 terminates in a nozzle 8 which has a rotary gate 9 for adjusting the nozzle. The nozzle is directed against a motor 10, the motor 10 being in the form of a wheel which is rotated as the liquid is discharged. The motor 10 is mounted on a shaft 11. The shaft 11 is journaled in a bearing 12 in the wheel housing 13 forming a part of the body 5. The opposite end of the shaft 11 is journaled at 14 in a cap plate 15 which is screwed into the housing 13.

The valve is provided with a knurled handle 16 and in the device shown when turned in one direction the mechanism is arranged to deliver a pint and when turned in the opposite direction the mechanism is arranged to deliver a quart. This affords a very simple scheme for varying the operation of the measuring device and one that can be readily understood and readily put in practice as these faucets are ordinarily used.

In order to close the faucet I arrange springs which when released turn the plug to closed position and permit of the turning of the plug in either direction to open. A cap 17 is screwed onto the plug at the opposite end from the knurled handle 16. A ring 18 is arranged in a socket in the end of the valve body, the socket being formed by the annular flange 19 on the body. The valve plug has a reduced portion 20 and the annular cavity 21 is formed between the reduced portion 20 and the ring 18. Springs 22 are arranged in cavities 21, the ends of the springs resting against a lug 23 extending from the ring 18 (see Figs. 4 and 7). The opposite end of the spring is arranged against a lug 24 carried by the valve plug 6. The movement of the springs is limited by a lug 25 which is of such size as to permit the passage of the lug 24 past it, the lug 25 projecting from the valve body. It will be observed that the valve plug may be turned in either direction and when turned in either direction will compress one or the other of the springs 22. The valve plug is turned to open position in Fig. 4 and to closed position in Fig. 7.

When the valve is opened, it is necessary to lock it in open position, and to automatically close it by the action of the motor 10 after the motor 10 has made a pre-determined number of revolutions. The handle 16 is provided with a cap 26 which incloses an annular space 27 formed by an annular shoulder 28 on the valve body. A lug 29 is arranged on the valve plug and swings in the annular groove or cavity 27. When it is swung in one direction the lug engages a shoulder 30 on a slide 32 and when swung in the opposite direction engages a shoulder 31 on a slide 33 and actuates these slides slightly so as to throw in the lug mechanism hereinafter described. When the slide 32 or 33 is actuated by the lug 29 the lug is locked by the shoulders 34 or 35 respectively so as to hold the valve in open position.

Catches 36 and 37 are arranged on the forward ends of the slides 32 and 33 respectively. When either of these slides are pushed forward by the lug 29 a catch 38 drops behind the shoulder 36 or 37 as the case may be locking that slide in its forward position and in consequence through the action of the shoulder 34 or 35 and lug 29 locking he valve in its open position. The catch 38 is carried by an arm 39 and the arm 39 by the pin 40 arranged between the ears 41 on the housing 13. A spring 43 tends to force the outer end of the catch 38 into engagement with the catch shoulders 36 and 37. The slides 32 and 33 have their forward ends or parts in front of the catch shoulders on a slant so as to lift the catch 38 when the slide is forced forward.

A releasing lever 44 is pivoted on the forward end of the slide 33 in position under the catch shoulder 37 to lift the catch 38 out of engagement with the shoulder when the lever 44 is raised. A gear segment 45 is carried by the front end of the lever 44 and when the slide 33 is moved to its forward position the gear segment is moved into engagement with a gear 46 carried by the shaft 47. The shaft 47 is mounted in the cone bearings formed by the screws 48—48 extending through the lugs 49—49 on the housing 13. A worm gear 50 is fixed on the shaft 47 and engages the worm 11ª on the shaft 11. The operation, therefore, of this side of the device is as follows: When the valve is opened by turning the knurled handle 16 toward the right, the slide 33 is operated moving the slide forward so that it is caught in its forward position by the catch 38. This forward movement throws the gear segment 45 into engagement with the gear 46. The same movement that swings the lug 29 so as to operate on the shoulder 31 of the slide 33 opens the valve and as the slide 33 is moved forward the shoulder 35 is moved to a position to engage the lug 29 and to prevent the closing of the valve so long as the slide 33 is retained in its forward position. The motor 10 as it rotates actuates the worm 11ª and this the worm gear 50 and gear 46 and this operating on the gear segment 45 swings the lever 44 upwardly to the position shown in dotted lines in Fig. 8. When the motor has made the predetermined number of revolutions the lever 44 reaches a point operating upon the catch 38 to trip this catch by lifting it out of engagement with the shoulder 37 thus releasing the slide 33 and the valve is immediately snapped shut by the action of the spring 22 which has been compressed. This movement also returns the slide to its normal position and the rack 45 moves to its initial position, a spring 44ª being provided to return the lever to its initial position.

In order to prevent the jamming of the teeth of the gear segment on the gear I prefer to yieldingly mount the gear segment on the end of the lever. To this end the gear segment has the extension or guide 52 which extends into the lever 44, the gear segment being mounted in a slot 44ᵇ in the end of the lever 44. A spring 53 yieldingly presses the gear segment forward. Pins 54 are arranged in the end of the lever and extend through slots 55 in the guide 52 thus supporting the guide and limiting its movement.

The gear 46 and the slide 33 are designed to deliver a quart of liquid when the valve is turned in this direction. The slide 32 when it is operated is designed to deliver a pint. Mechanism similar to that attached to the slide 33 is provided on the end of the slide 52, the main difference being that a gear 59 corresponding to the gear 46 is of twice the diameter of the gear 46 so that the lever 57 corresponding to the lever 44 trips the catch 38 in one-half the time or with one-half the number of revolutions of the motor 10. The parts on the slide 32 compress the lever 57 corresponding to the lever 44 and the gear segment 58 is arranged to operate with relation to the gear 59 corresponding to the gear segment 45. The guide 62 for the gear segment corresponding to the guide 52, the pins 61 corresponding to the pins 54, and the gear segment being arranged in the slot 57ᵇ corresponding to the slot 44ᵇ in the lever 44. In order to guide the gear segment and accurately locate the lever 44 as the gear segment is engaged so that a given amount of travel will be required to trip the catch 38 a supporting surface 56 is provided on the housing so that the gear segment engages the gear with fixed relation to the amount of travel necessary to trip the catch. Where the surface 56 is higher it is obvious that the gear segment 45 starting at a higher position will reach a releasing position earlier than where it starts at a lower position. By giving to the surface 56 the proper relation with relation to the gearing the proper timing may be accomplished.

With this mechanism it will be observed that as the valve is turned in one direction the slide 33 is operated and this throwing in the releasing mechanism actuated by the small gear 46 holds the valve open until a quart has been delivered. When the valve is turned in the opposite direction the slide 32 is actuated and the mechanism controlled by it operating on the larger gear 59 releases the slide with a less number of turns than the gear 46 and so is adapted to deliver a pint. It will be understood that different amounts may be delivered by varying the size of the gears but for the purpose to which this faucet is particularly designed pints and quarts are all that are desired.

The mechanism on the housing may be inclosed by a case 65 if desired.

What I claim as new is:—

1. In a measuring faucet, the combination of a valve opening and closing by a turning movement in either direction; devices for automatically closing the valve when opened by turning in either direction; and means actuated by the liquid discharged controlling said devices and varying the periods during which the valve is open when the valve is turned in one direction from the interval of opening when the valve is turned in the opposite direction.

2. In a measuring faucet, the combination of a valve opening and closing by a turning movement in either direction; devices for automatically closing the valve when opened by turning in either direction; and means actuated by the liquid discharged controlling said devices and varying the periods during which the valve is opened when the valve is opened in one direction to twice the interval of opening when the valve is turned in the opposite direction.

3. In a measuring faucet, the combination of a valve opening by a turning movement in either direction; spring actuated devices for automatically closing the valve; means for locking the valve against the spring devices and in an open position when turned in either direction; a motor actuated by the liquid discharged; and releasing devices actuated by the motor for releasing said means with a given movement of the motor.

4. In a measuring faucet, the combination of a valve opening by a turning movement in either direction; spring actuated devices for automatically closing the valve; means for locking the valve against the spring devices and in an open position when turned in either direction; a motor actuated by the liquid discharged; releasing devices actuated by the motor for releasing said means with a movement of the motor, varying when the valve is turned in one direction from that when the valve is turned in the other direction.

5. In a measuring faucet, the combination of a valve opening by a turning movement in either direction; a motor driven by the liquid discharged; gears of differing diameters driven by the motor; devices for locking the valve in open position; and releasing means actuated by said gears for releasing said devices.

6. In a measuring faucet, the combination of a valve opening by a turning movement in either direction; a motor actuated by the discharged liquid; gears of differing diameters actuated by the motor; locking means for locking the valve when turned in either direction; gear segments thrown into engagement with said gears, one of said gears when the valve is turned in one direction and the other of said gears when the valve is turned in the opposite direction; means actuated by said segments for releasing the valve; and spring actuated devices for actuating the valve.

7. In a measuring faucet, the combination of a valve opening by a turning movement in either direction; spring actuated devices arranged to automatically close the valve when turned in either direction; slides arranged at each side of the valve and having engaging shoulders; a lug on the valve for engaging said shoulders, one of said slides being operated when the valve is turned in one direction and the opposite slide being operated when turned in the opposite direction, said shoulders locking the valve in an open position when a slide has been moved by the valve; catches for locking the slides when moved; a motor actuated by the liquid discharged; gears of differing sizes actuated by the motor; gear segments operating on said gears; and releasing devices actuated by said gear segments for automatically releasing the slides and permitting the closing of the valve.

8. In a measuring faucet, the combination of a valve opening by a turning movement; a slide actuated with a turning movement of the valve; a catch for locking the slide in its moved position; means on the slide for locking the valve in open position; a gear segment pivotally mounted on the slide; a gear actuating the gear segment; a motor actuated by the discharged liquid for actuating the gear; and means actuated by the gear segment for tripping the catch with a predetermined movement of the wheel.

9. In a measuring faucet, the combination of a valve opening by a turning movement; a slide actuated as the valve is turned and locking the valve in open position; a catch for locking the slide; a gear segment pivotally mounted on the slide; a gear operating on the gear segment and engaged by the gear segment when the slide is moved by the opening movement of the valve; a motor actuated by the discharged liquid for actuating the gear; and a yielding mounting for the gear segment.

In testimony whereof I have hereunto set my hand in the presence of two subscribing witnesses.

JOHN VAN GEEM.

Witnesses:
C. D. S. HIGBY,
DOUGLAS BENSON.